United States Patent
Orndorff et al.

(10) Patent No.: US 12,540,454 B2
(45) Date of Patent: Feb. 3, 2026

(54) SYSTEM FOR DETERMINATION OF LINE AND LEVEL FOR TRENCHLESS CONSTRUCTION

(71) Applicant: PLG Technologies, Inc., Bakersfield, CA (US)

(72) Inventors: Aaron Orndorff, Bakersfield, CA (US); Brian Sherrell, Bakersfield, CA (US)

(73) Assignee: PLG Technologies, Inc., Bakersfield, CA (US)

( * ) Notice: Subject to any disclaimer, the term of this patent is extended or adjusted under 35 U.S.C. 154(b) by 417 days.

(21) Appl. No.: 18/229,813

(22) Filed: Aug. 3, 2023

(65) Prior Publication Data
US 2024/0052593 A1 Feb. 15, 2024

Related U.S. Application Data

(60) Provisional application No. 63/396,713, filed on Aug. 10, 2022.

(51) Int. Cl.
*E02F 5/10* (2006.01)
*G01C 9/06* (2006.01)

(52) U.S. Cl.
CPC .............. *E02F 5/104* (2013.01); *G01C 9/06* (2013.01); *G01C 2009/066* (2013.01)

(58) Field of Classification Search
CPC .................................. E02F 5/104; G01C 9/06
USPC .............................. 33/366.11, 366.16, 366.23
See application file for complete search history.

(56) References Cited

U.S. PATENT DOCUMENTS

| | | | | |
|---|---|---|---|---|
| 2,598,350 A | * | 5/1952 | Carroll | E02F 3/06 37/350 |
| 3,857,449 A | * | 12/1974 | Kimura | E21D 9/005 175/45 |
| 4,395,158 A | * | 7/1983 | Brooks | E02F 5/109 405/161 |
| 4,438,820 A | * | 3/1984 | Gibson | E21B 47/022 175/45 |
| 5,014,795 A | * | 5/1991 | Gibson | G01C 9/20 33/366.19 |
| 5,337,002 A | * | 8/1994 | Mercer | E21B 47/024 324/67 |
| 5,357,339 A | | 10/1994 | Teraoka et al. | |

(Continued)

FOREIGN PATENT DOCUMENTS

WO    WO2018132659 A1    7/2018

*Primary Examiner* — George B Bennett
(74) *Attorney, Agent, or Firm* — James M. Duncan; Young Wooldridge, LLP (57) ABSTRACT

A line and level determination system for a trenchless construction apparatus has a block assembly which is attached by welding to a lead casing to be installed with the trenchless construction apparatus. The block assembly has a water inlet, a water outlet, a tilt sensor and a light emitting device disposed within the water outlet. A water hose has a first end attached to the water inlet and a second end attached to a water source. The line and level determination system has a controller connected to the tilt sensor and the light emitting device. The controller selectively energizes the tilt sensor and the light emitting device. Data from the tilt sensor is displayed on a screen of the controller. A surveying instrument, such as a theodolite, may be utilized to determine line from the illumination of the light emitting device into the casing.

20 Claims, 10 Drawing Sheets

(56) References Cited

U.S. PATENT DOCUMENTS

| | | | | |
|---|---|---|---|---|
| 5,626,438 | A * | 5/1997 | Etheridge | E02F 5/104 15/104.04 |
| 6,088,090 | A * | 7/2000 | Hoshi | G01B 11/26 356/139.1 |
| 6,112,809 | A * | 9/2000 | Angle | E21B 47/26 175/45 |
| 6,139,053 | A * | 10/2000 | Knox | G01P 15/105 200/61.45 R |
| 6,203,111 | B1 | 3/2001 | Ollis et al. | |
| 6,449,857 | B1 * | 9/2002 | Anikolenko | G01C 9/06 33/366.19 |
| 7,832,960 | B2 * | 11/2010 | Home | E21D 9/0873 299/33 |
| 8,061,050 | B2 * | 11/2011 | Argov | E03F 7/12 33/1 H |
| 8,276,687 | B2 | 10/2012 | Malcolm | |
| 8,326,095 | B2 * | 12/2012 | Hartog | G01C 9/06 385/13 |
| 8,351,046 | B2 | 1/2013 | Justin | |
| 8,622,901 | B2 * | 1/2014 | Jain | A61B 5/165 600/300 |
| 9,181,752 | B2 | 11/2015 | Malcolm | |
| 9,464,482 | B1 | 10/2016 | Bargach et al. | |
| 9,568,318 | B2 | 2/2017 | Taranta | |
| 9,650,834 | B1 | 5/2017 | Bargach et al. | |
| 9,759,062 | B2 * | 9/2017 | Deffenbaugh | E21B 47/14 |
| 9,816,321 | B2 | 11/2017 | Malcolm | |
| 10,060,195 | B2 | 8/2018 | Moeny | |
| 10,240,320 | B2 * | 3/2019 | Bellin | B63B 35/03 |
| 10,317,208 | B2 * | 6/2019 | Schafer | G01C 9/06 |
| 10,407,995 | B2 | 9/2019 | Moeny | |
| 11,353,325 | B2 | 6/2022 | Mueckl | G01C 9/06 |
| 11,411,298 | B2 * | 8/2022 | White | E21B 47/13 |
| 11,668,563 | B2 * | 6/2023 | Sakakibara | G01C 9/04 33/366.27 |
| 12,031,844 | B2 * | 7/2024 | Taguchi | G01C 9/22 |
| 2017/0234129 | A1 | 8/2017 | Preston et al. | |
| 2022/0210650 | A1 * | 6/2022 | Ericksen | H04W 4/80 |

* cited by examiner

SYSTEM FOR DETERMINATION OF LINE AND LEVEL FOR TRENCHLESS CONSTRUCTION

BACKGROUND OF THE INVENTION

The present invention generally relates to trenchless construction. It more specifically relates to determining the line, level, pitch, and roll of a casing being installed by auger boring or pipe ramming apparatuses utilized in trenchless construction, which are two examples of processes for boring a hole for installation of a utility line.

Horizontal earth boring is one method utilized to install pipes, conduits and the like (collectively "pipe" or "pipes") under roadways, waterways, railroad tracks, and other structures which prevent installing the pipe by trenching. Auger boring is one known method of installing pipe in the above situations. Unless steered by a mechanical/hydraulic steering head or other steering technologies, controlling the line and level of a borehole drilled with an auger head can be difficult. However, auger boring without use of a steering head remains in wide use because of its relatively low-cost relative to the more modern methods and because it is widely understood by those knowledgeable in the art.

The basic components of an auger system are a hydraulically powered base unit, a casing pusher, a power pack, the auger sections, and lengths of track. The base unit is typically set up in a pit. The auger utilizes a revolving cutting head that is located at the leading end of an auger string. Excavated material is brought back to the pit by the rotation of the helical auger flights inside the casing. As the auger cuts through the earth, sections of casing are added at the rear end of the casing until the installation has been completed.

While directional control is possible in conventional auger boring, the determination of line (i.e., horizontal alignment) and grade (i.e., elevation) remain important. Certain measures may be taken with conventional auger boring to correct line and grade. Or, if necessary, a mechanical/hydraulic steering head may be utilized to make necessary corrections.

One method of ascertaining the elevation of the lead joint for an auger boring system is with a "Dutch Level" or water level. With the Dutch Level, a block is welded to the lead section of the pipe being installed typically about 5 feet backward from the leading edge of the pipe. The block has an inlet for receiving a flow of water and an outlet for venting excess water. A length of hose or pipe (hereinafter collectively referred to as "hose") is attached to the inlet of the block, with the hose being run in and secured to the pipe sections as they are inserted into the bore. The opposite end of the hose is connected to a level indicator set within the pit. The level indicator has a vertical transparent tube having graduated markings, with the water level in the transparent tubing equalizing with the level in the block, thereby indicating the elevation of the lead pipe.

However, while the water level provides an indication of elevation, it does not indicate pitch or roll nor does it show the "line" of the pipe, i.e., horizontal alignment. Determining grade and line in auger boring is typically limited to casings large enough for the entry of personnel. If the diameter is large enough, the augers are withdrawn from the casings and a worker walks or crawls through the connected lengths of casing to the front of the lead pipe and shines a light or laser back to the pit. Utilizing surveying equipment such as a theodolite, grade and line can be determined utilizing the light beam from the worker. Because of the personnel access requirement, determination of grade and line in auger boring has been limited to casings having a diameter of at least 24 inches.

While other systems exist for ascertaining grade and line during the installation of a borehole, such as pilot tube boring and mechanical/hydraulic steering heads, a large percentage of boreholes are installed with the conventional auger boring techniques. Therefore, a low-cost system for ascertaining line and grade is desirable. While it is anticipated that the present invention fits a particular need for use in connection with conventional auger systems, it is to be appreciated that embodiments of the present invention may be utilized in connection with other trenchless boring systems as either a backup and/or enhancement of those systems.

SUMMARY OF THE INVENTION

An embodiment of the line and level determination system for an auger boring apparatus has a housing assembly which may be attached to a lead casing containing the boring apparatus possibly including the lengths of auger. The housing assembly comprises a front end, a rear end, a top, a bottom. A longitudinal axis is defined between the front end and the rear end of the housing assembly.

The rear end of the housing assembly comprises an entry through which a water line and wire leads may be introduced into the housing. The water line has a first end attached to a water discharge disposed at the front of the housing assembly and the water line has a second end attached a water or liquid source, typically connected to a water manifold in the bore pit.

The water discharge is positioned on the underside of the housing assembly. The water discharge is positioned against a wall-penetrating aperture which has been made through a wall of the lead casing, such that water flowing from the water discharge will flow through the aperture to an interior of the lead casing. A light emitting device, such as one or more light emitting diodes or a laser, is set within or adjacent to the water discharge. The light emitting device is configured to illuminate the stream of water which flows from the water discharge through the aperture and into the interior of the lead casing.

The housing assembly may further comprise an inclinometer for determining the orientation or inclination of the lead casing, such as a tilt sensor. The inclinometer is set within a cavity or other protected structure within the housing assembly. The housing assembly may further comprise one or more internal conduits for routing lead wires through the housing assembly to the inclinometer and/or to the light emitting device.

The light emitting device and the inclinometer may be configured in a board module. The inclinometer may comprise a 3-axis accelerometer for the determination of pitch and roll. The board module may comprise board mounted light emitting diodes which are placed to illuminate the water stream as water flows through the water discharge into the lead casing. When so configured, the illuminated water stream is typically visible from the bore pit thereby allowing determination of bore line with a surveying instrument, such as a theodolite. Additional data may be obtained through the board module, including elevation, bore casing pitch in percent of slope or degrees, bore casing roll in 0.01-foot increments or degrees. The board module may be encased in opaque epoxy or acrylic to protect the board from water and dirt.

Given the physical impacts to which the housing assembly will likely be subjected as the casing is jacked or rammed through the soil, it is desirable that the exterior of the housing assembly be fabricated from durable materials. It is also desirable that the housing assembly have a low profile which provides minimal resistance as the casing is pushed through the soil. One acceptable configuration for the housing is steel angle iron, with opposing edges of the angel iron disposed against the casing forming a "tent" structure over the electronic components of the apparatus including the light emitting device, inclinometer, board module, etc. These components may be encased within a waterproof epoxy to protect those components, with the epoxy casement disposed in the underside of the angle iron. The angle iron may have a pointed nose member to reduce resistance as the device is pushed through the soil.

In addition to the angle iron housing discussed above, the housing assembly may also be configured as a solid block according to the construction of the Dutch level sensing blocks known in the art. In such embodiments, the housing assembly is configured as a block comprising one or more drilled holes configured to prevent air bubbles from working back to a level indicator at the second end of the hose.

Whether configured from angle iron or a block, the housing assembly is configured through its volume, shape, and material selection to allow attachment of the body of the housing assembly to the lead casing without resulting in damage to the inclinometer, wiring and other sensitive components. For example, the housing assembly may be attached to the lead casing by welding the edges of the housing assembly to the lead casing, avoiding the portions of the housing which contain heat sensitive components. The housing assembly may include markings which indicate the recommended welding surfaces of the housing. The housing assembly is also configured such that at the conclusion of a borehole installation, the housing assembly may be detached from the lead casing by cutting torch or other means or simply left in the ground because of its relatively low price.

A controller may be conductively connected to the housing assembly by power and communication cables. The controller comprises a power source, a plurality of controls to energize the inclinometer and the light emitting device, and a screen for displaying input from the tilt sensor. The controller may receive pitch and roll data from the housing assembly through instrument cables. The controller allows an operator to program a "design grade" at the beginning of the bore and calibrate the tilt sensor to the actual lead joint grade. The controller further allows the operator to program casing size to convert roll degrees to 0.01 ft increments. The controller may store programmed design grade and casing diameter as retentive variables unless cleared upon completion of a bore or start of a new bore. The controller may be configured to provide local or remote data logging capability. The controller may be powered by 12 VDC, which may be provided through a 120 VAC to 12 VDC transformer.

In operation, an operator may initiate a flow of water through the housing assembly and energize the light emitting device from the controller. Upon being energized, the light emitting device illuminates the water stream entering into the lead casing through the aperture hole burned or machined into the lead casing. This illuminated beam may be utilized with a surveying instrument located in the pit, such as a theodolite or other surveying instrument for an accurate determination of line, or inspected by the naked eye. The operator may also energize the inclinometer and receive input from the inclinometer which may be displayed on a screen.

DETAILED DESCRIPTION OF THE EMBODIMENTS

Figure 1:
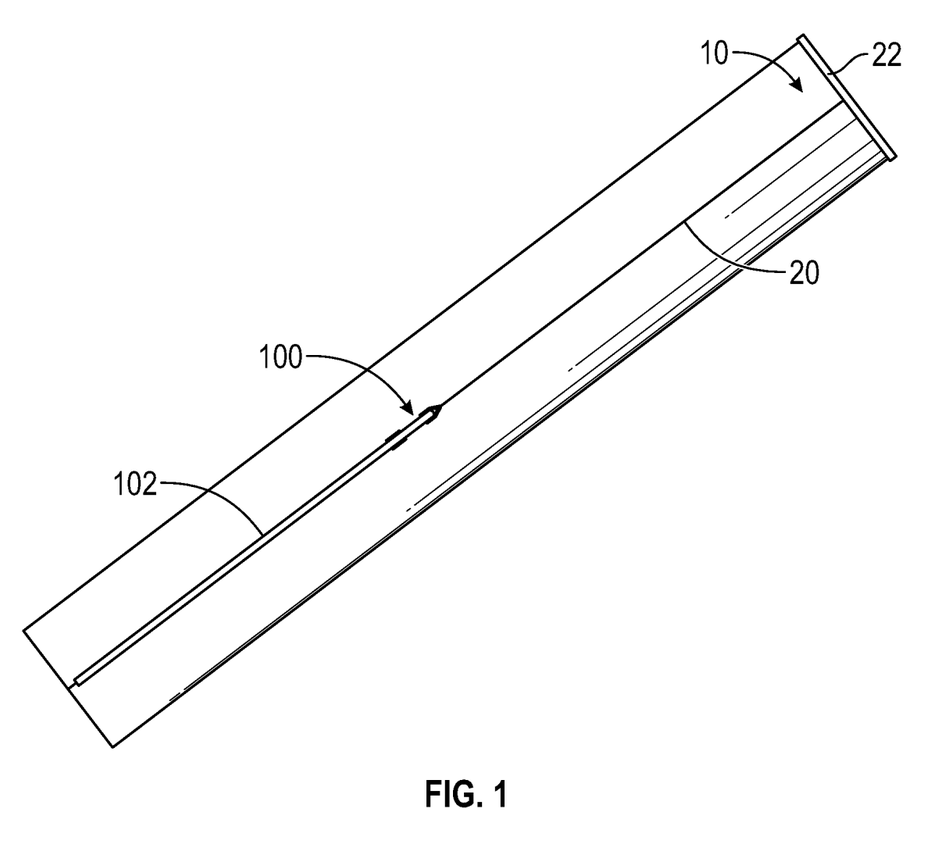
FIG. 1 shows a top view of a lead casing utilized in an auger boring apparatus showing the placement of a housing assembly utilized in embodiments of the presently disclosed line and level determination system.
Figure 2:
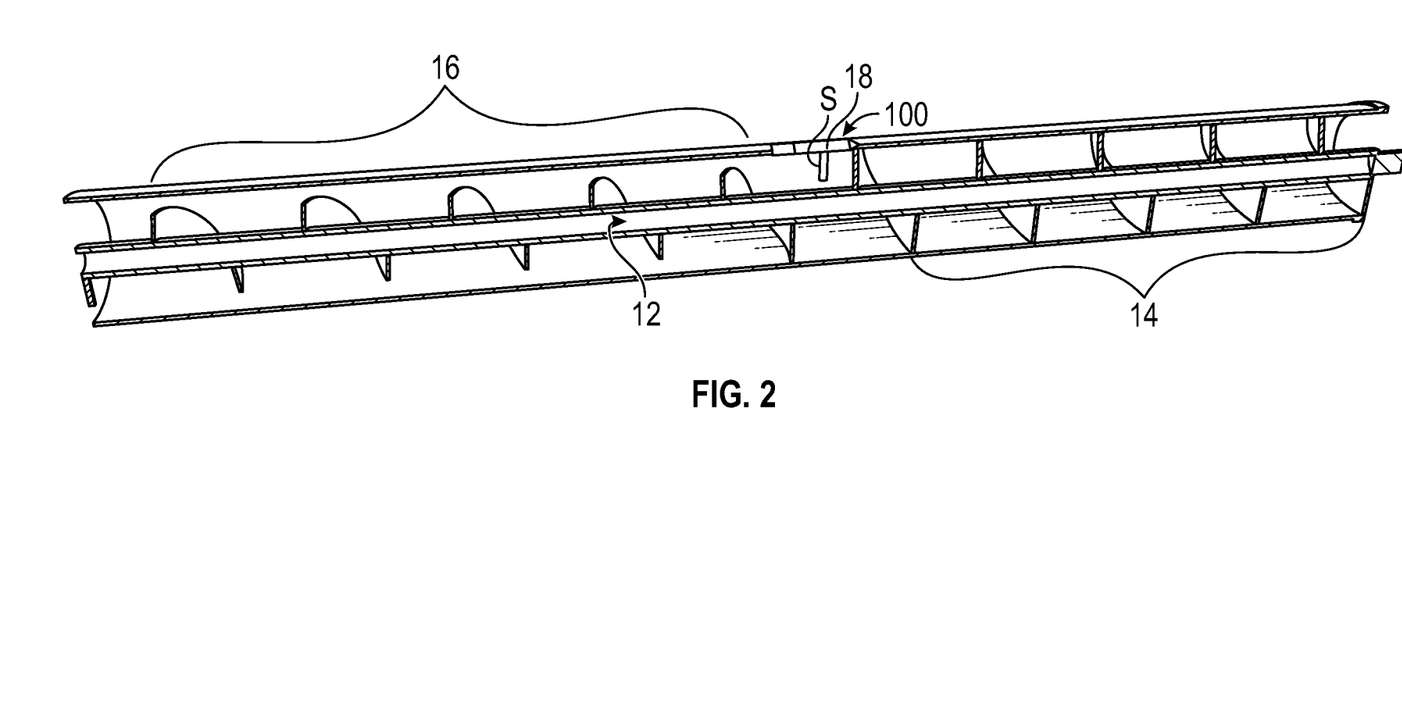
FIG. 2 shows a side sectioned view of a lead casing utilized in an auger boring apparatus showing the auger and the placement of an embodiment of the housing assembly on the lead casing.

Referring now to the figures, FIG. 1 shows a top view of a lead casing 10 utilized in an auger boring apparatus. As shown in FIG. 2, lead casing 10 houses an auger assembly 12 as depicted in FIG. 2. Auger assembly 12 has a lead section 14 of augers having a diameter which approximates the diameter of the casing to be installed in the bore hole. Lead section 14 is typically about ten feet in length. Auger assembly 12 also has a second section 16 of augers attached behind lead section 14, with the augers of the second section 16 having a smaller diameter than the augers of the lead section 14. An aperture 18 is installed with the aperture penetrating through the wall of the lead casing 10. Aperture 18 is installed on the upper side of lead casing 10 and preferably positioned such the aperture penetrates through the lead casing at the transition between the lead section 14 of augers and the second section 16 of augers. This placement allows the illuminated water stream S discussed below to be visible without pulling the auger assembly 12 from the lead casing 10.

Referring again to FIG. 1, a housing assembly 100 of the present invention is attached to lead casing 10, typically by welding. Housing assembly 100 is positioned above aperture 18 at the approximate top dead center line 20 of the lead casing 10. Sections of cable/hose shield members 102 extend from the rear of housing assembly 100 back to the bore pit. Shield members 102 are progressively attached to the top of the casing at the bore pit as the casing pushed into the bore hole. An acceptable material for shield members 102 is a 1½ inch×1½ inch×0.125 inch angle iron. Lead casing 10 may further comprise a relief band 22 at its lead end.

Figure 3:
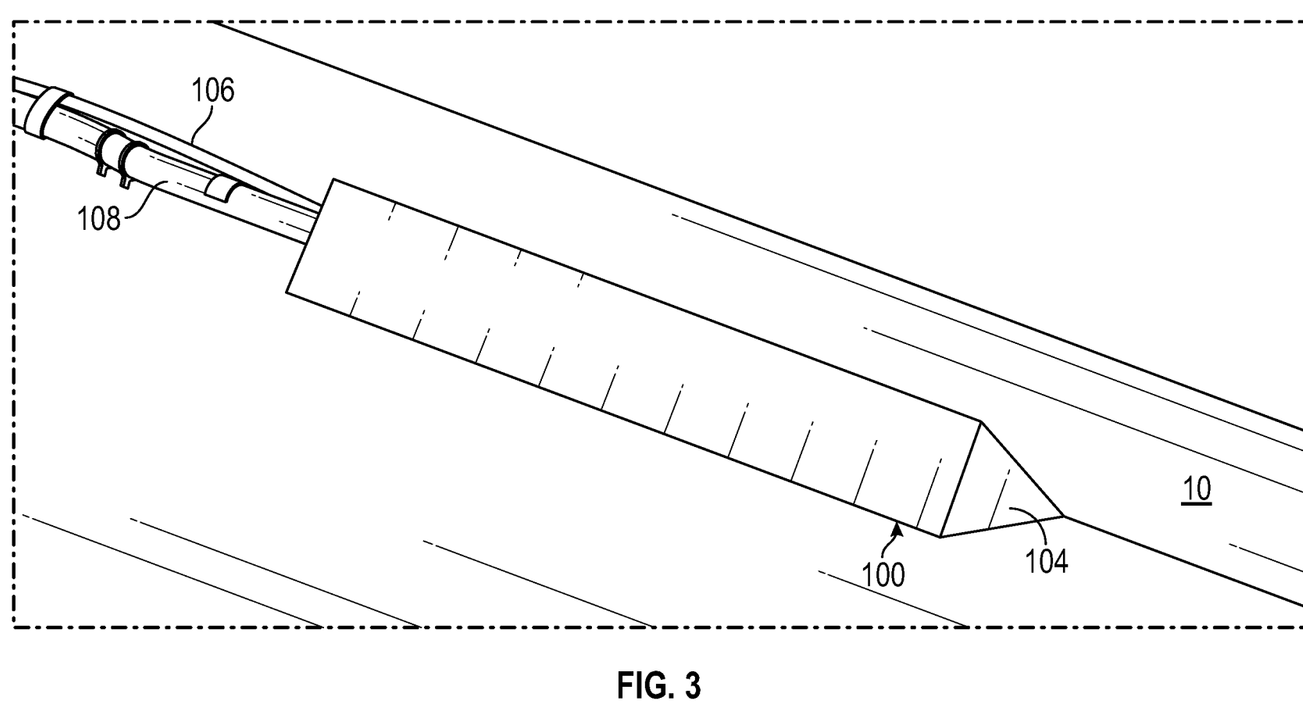
FIG. 3 shows a top view of an embodiment of the housing assembly attached to a lead casing of an auger boring apparatus.

FIG. 3 shows a top view of an embodiment of the housing assembly 100 attached to a lead casing 10 of an auger boring apparatus. FIG. 3 shows that housing assembly 100 may have a pointed nose 104 which reduces resistance as the device is pushed through the bore. FIG. 3 also shows a power and communications cable 106 and a water hose 108 extending from the rear of housing assembly 100. As indicated in FIG. 1, power and communications cable 106 and water hose 108 are placed beneath shield member 102 and extend back to the bore pit.

Figure 4:
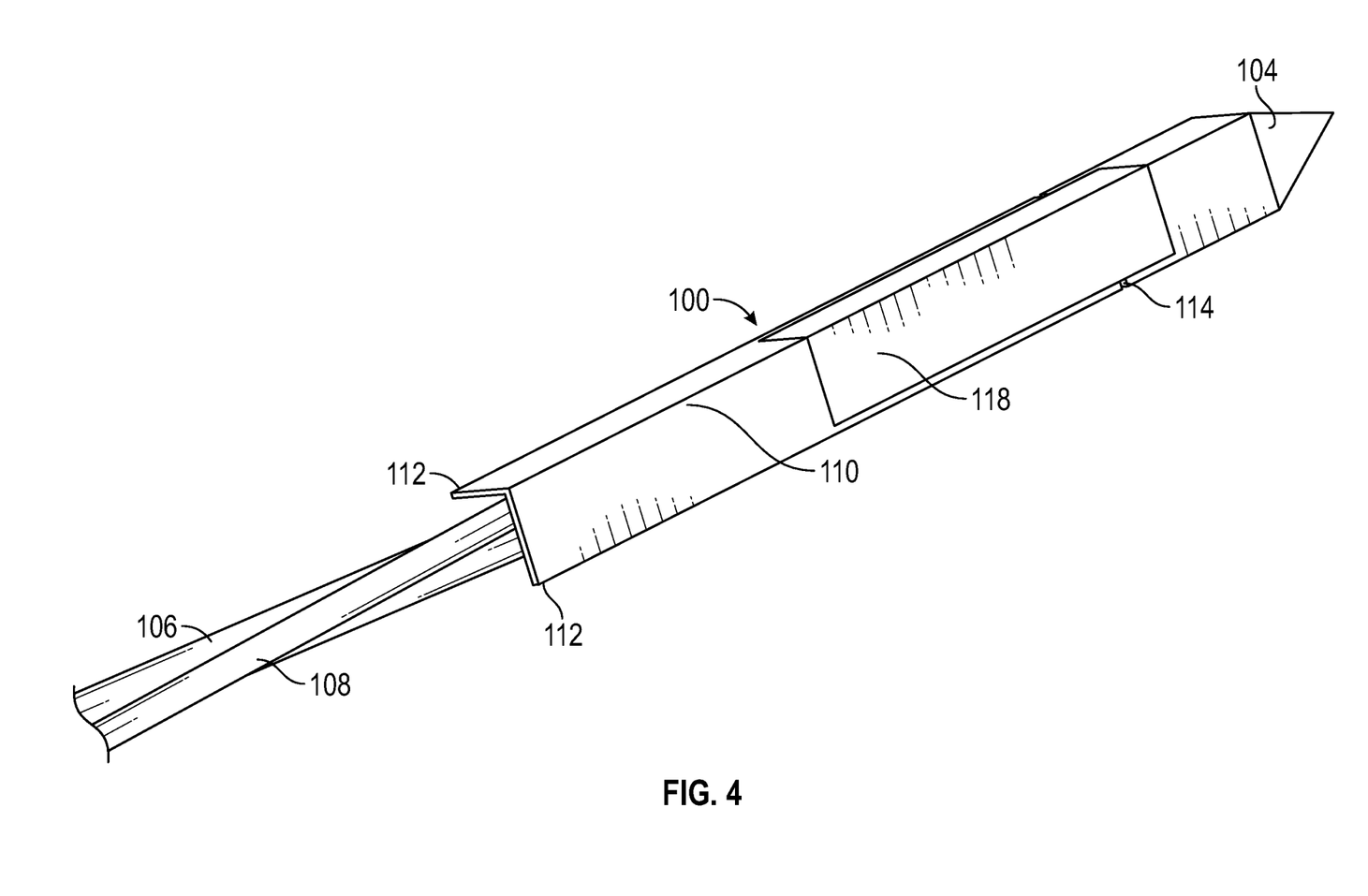
FIG. 4 shows a perspective view of an embodiment of a housing assembly utilized in the presently disclosed line and level determination system.

FIG. 4 shows a perspective view of an embodiment of housing assembly 100. As shown in FIG. 4, the exterior 110 of housing assembly 100 may be fabricated from a piece of wall angle iron which may have a size of 1¾%" by 1¾%" by 0.1875", with the edges 112 laying flush against the surface of lead casing 10 and attached by welding or other appropriate means. Housing assembly 100 may have alignment notches 114 which are utilized for properly positioning the housing assembly 100 on lead casing 10 so that the water discharge 116 shown in FIG. 5 aligns with the aperture 18 in lead casing 10. FIG. 4 also shows a "no weld" area 118 of the housing assembly 100 to be observed to prevent damage to the inclinometer, wiring and other heat sensitive components. It is to be appreciated that instead of the housing assembly 100 depicted in the figures, an alternative embodiment may utilize a block configuration for the housing assembly as used in the Dutch Level device, but which has been modified to include the additional components discussed below.

Figure 5:
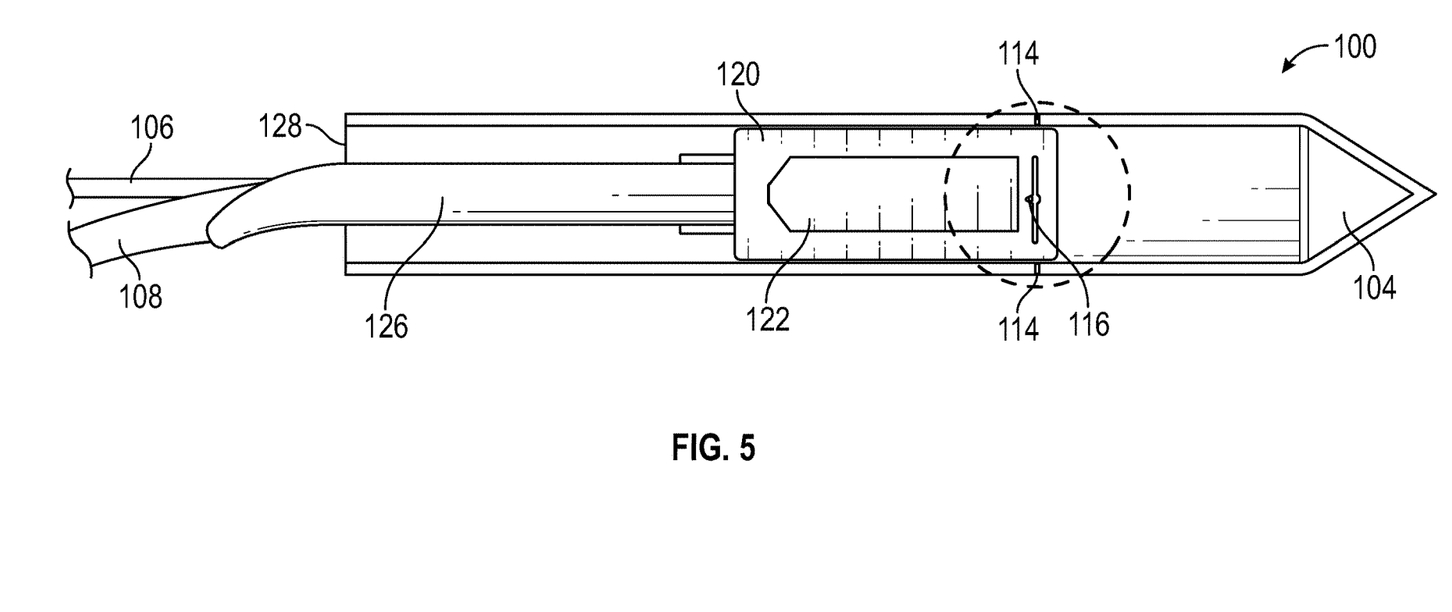
FIG. 5 shows a bottom view of the housing assembly shown in FIG. 4.
Figure 6:
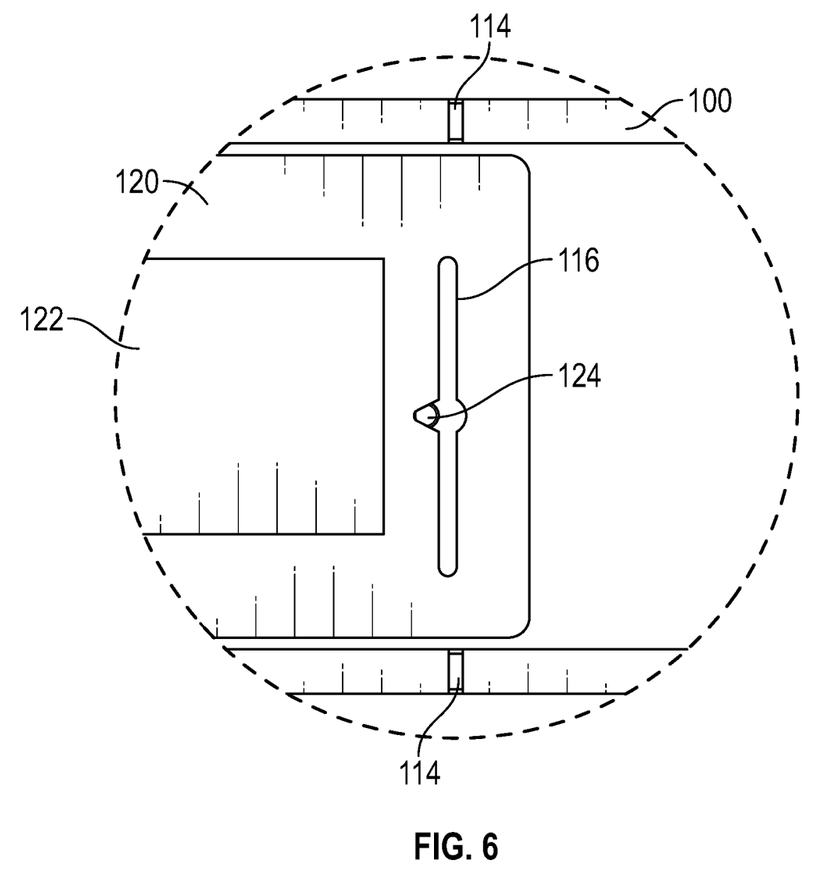
FIG. 6 shows the detailed view indicated in FIG. 5.

FIGS. 5 and 6 show a bottom view of the housing assembly 100. As shown in FIG. 5, a sensor insert 120 is placed within the bottom opening of housing assembly 100. Sensor insert 120 contains a sensor package 122. Sensor package 122 contains an inclinometer and other electronic components such as a board module which may be encased in waterproof epoxy or the like. Sensor package 122 includes a board mounted light emitting device such as a light emitting diode 124 as shown in FIG. 6. Light emitting diode 124 or other illuminating device illuminates a water stream S which flows through water discharge 116 into aperture 18 into the interior of lead casing 10. The inclinometer may comprise a 3-axis accelerometer for the determination of peach and roll. Power and communications cable 106 and water hose 108 may be wrapped in a protective heat wrap 126. Power and communications cable 106 may enter housing assembly 100 through opening 128.

Figure 7:
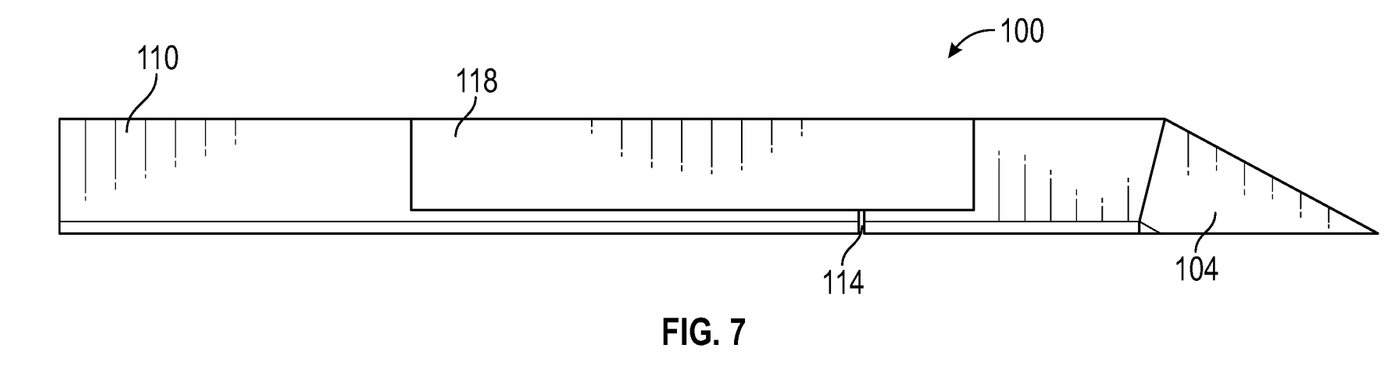
FIG. 7 shows a side view of the housing assembly shown in FIG. 4.
Figure 8:
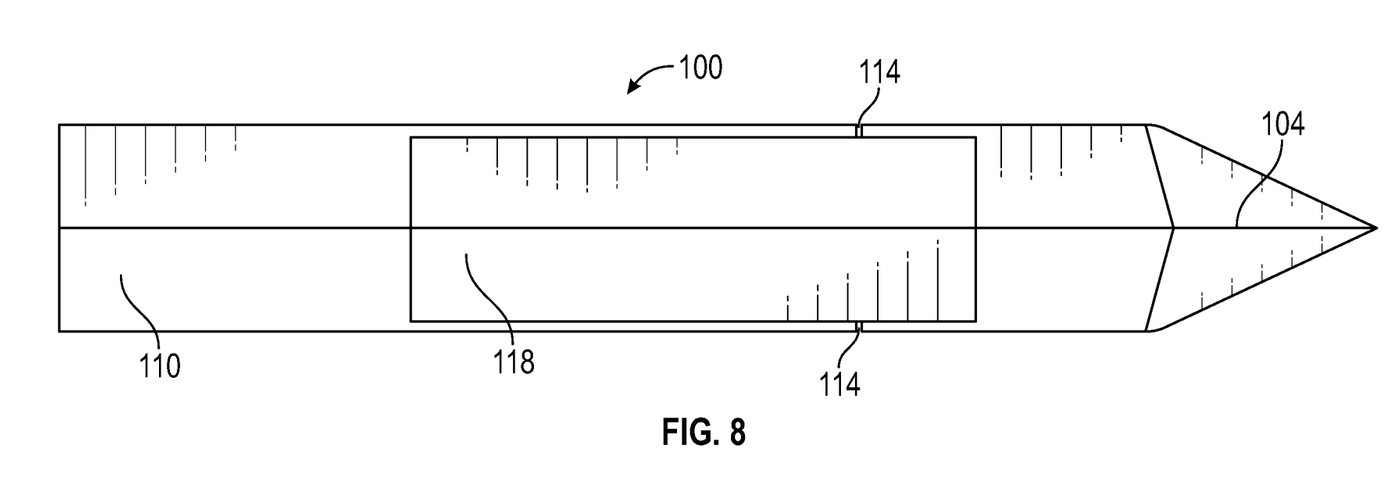
FIG. 8 shows a top view of the housing assembly shown in FIG. 4.

FIGS. 7-8 respectively show side views and top views of housing assembly 100 showing pointed nose 104, exterior 110, alignment notches 114 and no weld area 118.

Figure 9:
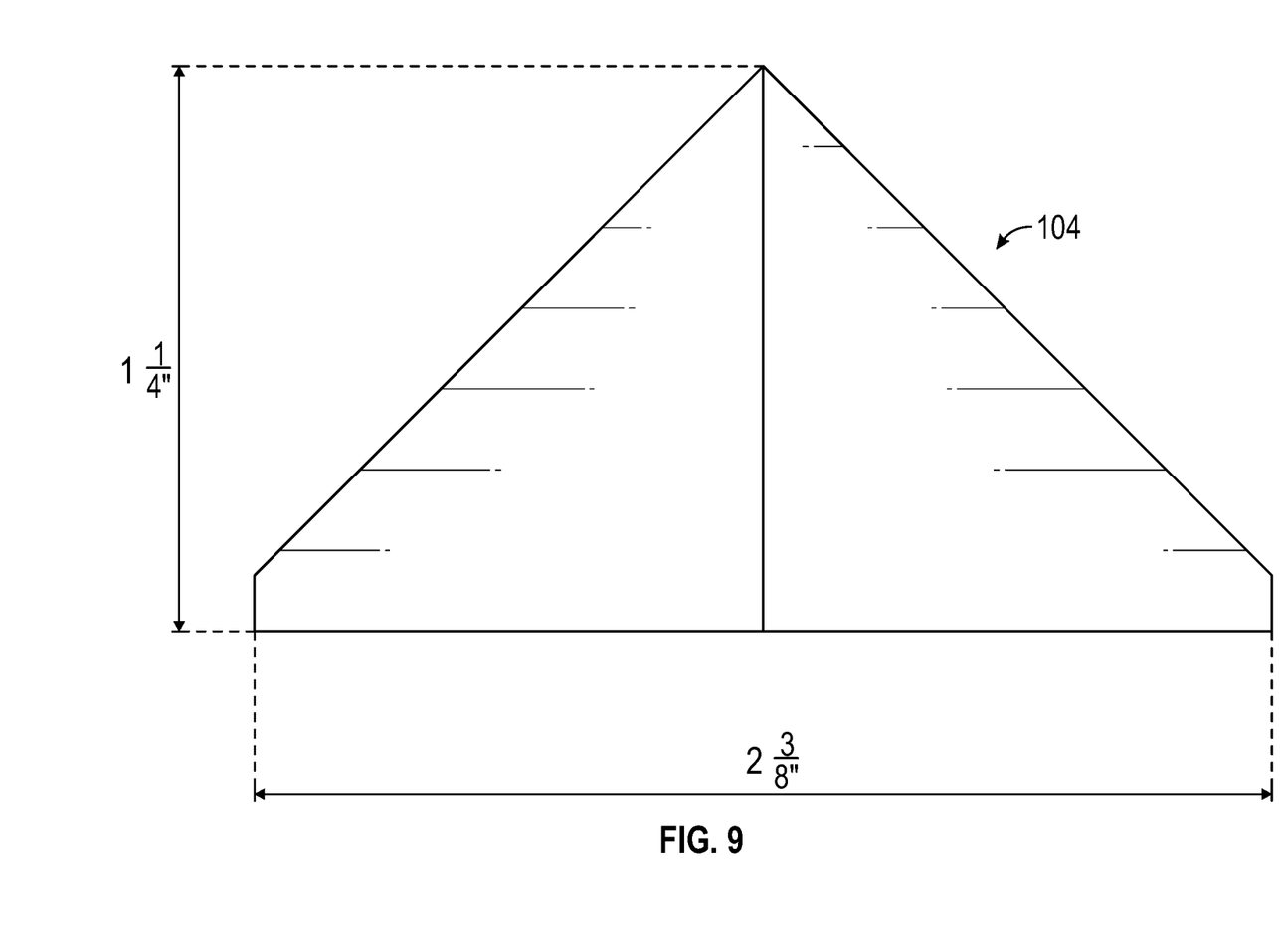
FIG. 9 shows a dimensioned view of an embodiment of a nose piece which may be utilized for embodiments of the housing assembly.

FIG. 9 shows a dimensioned view of an embodiment of a nose piece 104 which may be utilized for embodiments of the housing assembly 100 which is compatible for use with a housing assembly 100 fabricated from a section of wall angle iron having a size of 1¾%" by 1¾%" by 0.1875".

Figure 10:
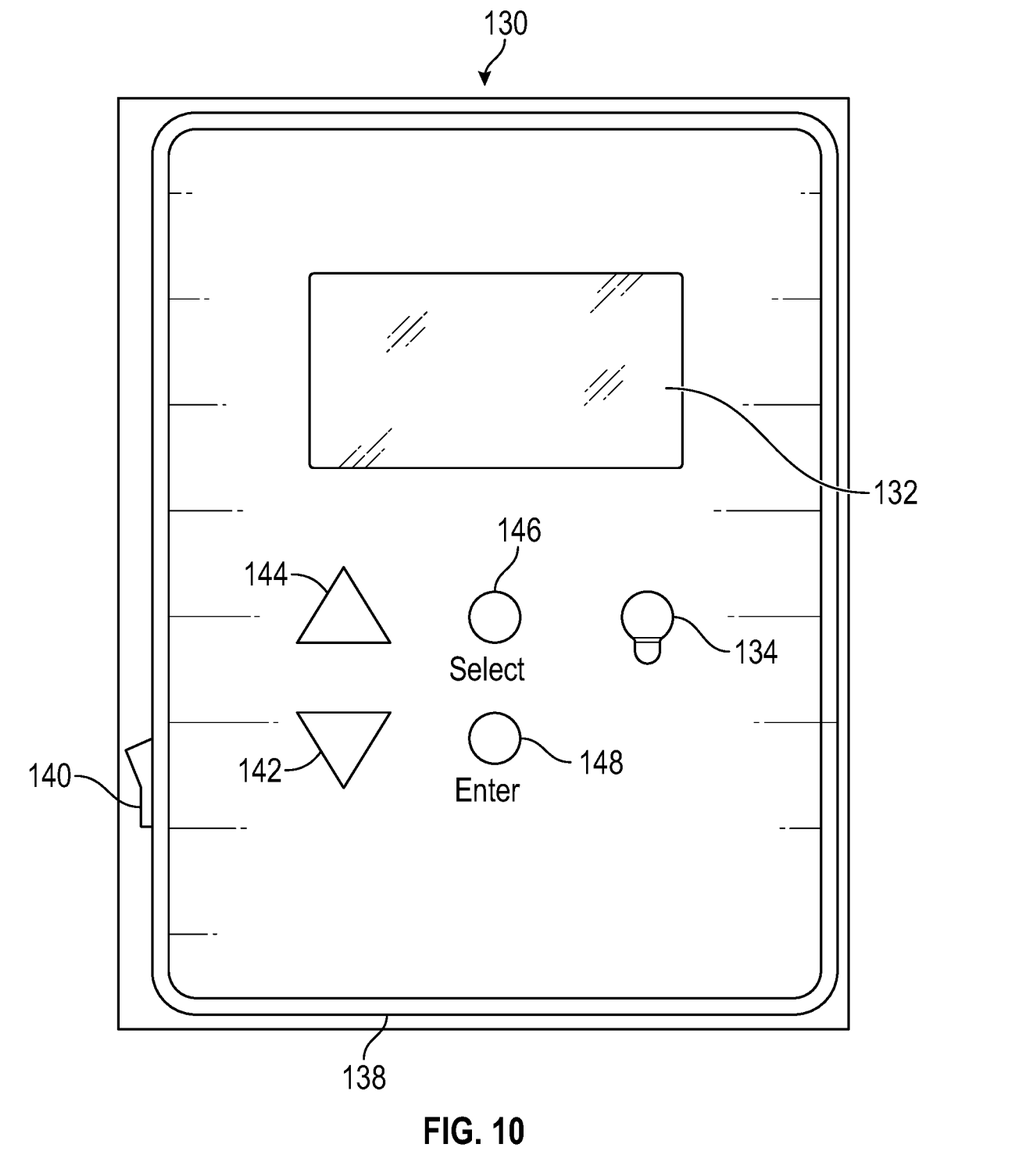
FIG. 10 shows an embodiment of a controller which may be utilized in embodiments of the presently disclosed line and level determination system.

FIG. 10 shows an embodiment of a controller 130 which may be utilized in embodiments of the presently disclosed line and level determination system. Controller 130 may use a RJ45 568b connector which provides a direct current voltage and receives electronic signals to/from the sensor package 122 within housing assembly 100 by power and communications cable 106.

Controller 130 may have a display screen 132. Controller 130 may further have a control 134 which may be utilized to activate the light emitting diode 124 or other light emitting device, such as a laser, which illuminates the stream of water flowing through water discharge 116 into the interior of lead casing 10. Control 134 may be of the toggle switch type. Controller 130 may have a 12 VDC power supply jack 138. Controller 130 may be energized by a power switch, such as rocker switch 140. Arrow down button 142 and arrow up button 144 are utilized to adjust selections presented on display screen 132. Select button 146 is utilized to make various selections from display screen 132 and enter button 148 is utilized for entering the desired selections.

Figure 11:
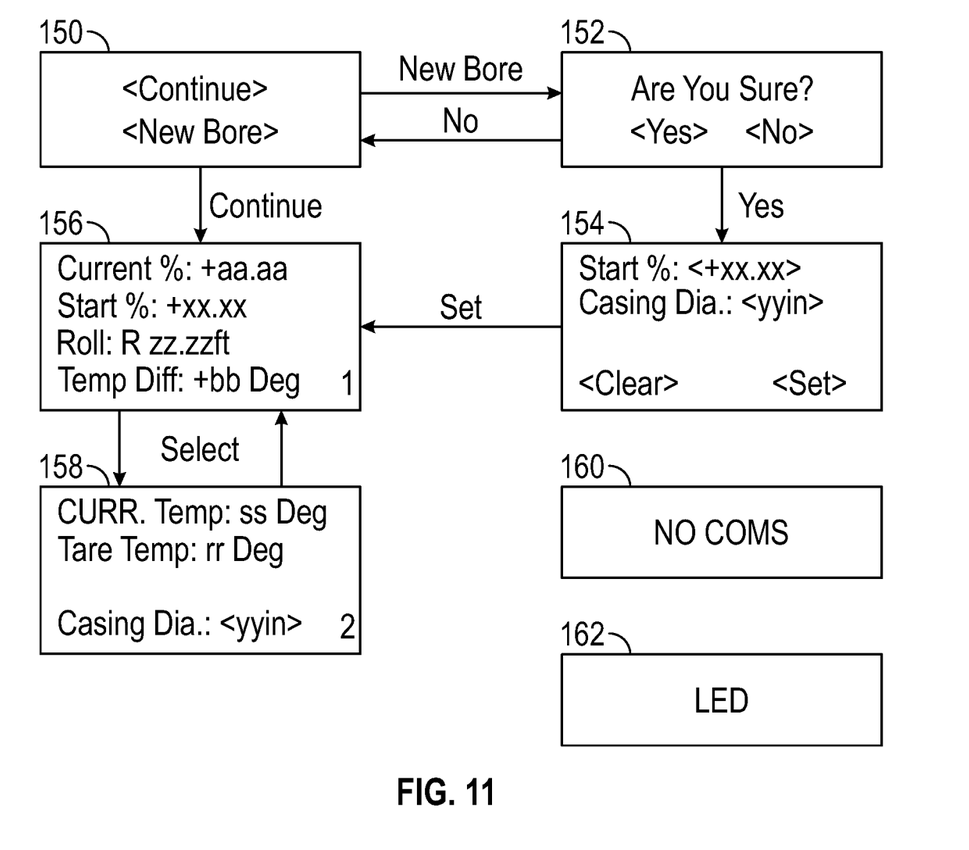
FIG. 11 provides an illustrative flow diagram displayed on a screen of the controller for programming a specific bore design.

FIG. 11 shows various screens which may be displayed on display screen 132 of the controller 130 during the set-up and operation of the presently disclosed line and level determination system.

FIG. 11 shows a power screen 150 which is the first visible screen when the controller 130 is first powered up by activating power switch 140. The power screen 150 provides an operator to select one of two options. Selection of the "continue" option retains all stored variables. Selection of the "new bore" option sends the operator to verification screen 152. The select button 146 is utilized to make the desired selection which is implemented by using the enter button 148.

Verification screen 152 provides the user an opportunity to erase stored variables. Selection and entry of the "yes" option erases the stored values and sends the operator to calibration screen 154 to enter new values. Selection and entry of "no" takes the user back to first screen 150.

Calibration screen 154 allows the user to set initial values for the size and grade of the housing assembly 100 attached to the lead casing 10. Selection and entry of the "start %" option allows the user to decrease or increase the observed value for the starting grade of the lead casing 10 in 0.05% increments by utilization of arrow down button 142 or arrow up button 144. The maximum/minimum starting grades are set at +/−30.00%. The default value for the starting grade is 0.00 percent. Selection and entry of the "casing dia." option allows the user to select the casing diameter. Arrow down button 142 decreases casing diameter by 1 inch for each depression of the button. Arrow up button 144 increases casing diameter by 1 inch for each depression of the button. The default value for casing is set at 6 inches and the maximum value is 96 inches. Selection of the "clear" option sets the starting grade and casing diameter to the default values. Selection of the "set" option locks the design grade and the casing diameter. The "set" option also saves observed values for current grade, current roll, and current temperature as observed by the devices contained within the sensor package 122.

FIG. 11 also shows a first display screen 156 which is observed during the operation of the system. The first display screen 156 has a first field which shows the current percent grade of the housing assembly attached to the lead casing 10 with an accuracy of +/−0.05 percent. The first display screen 156 has a second field which shows the start percent grade which was defined by the user on calibration screen 154. The first display screen 156 has a third field which shows the amount of circumferential roll the housing display 100 is experiencing, measured in 0.01 foot increments. If the third field displays an "R", it indicates a roll to the right, which is clockwise roll when viewed from the bore pit. If the third field displays an "L", it indicates a roll to the left, which is a counter-clockwise roll when viewed from the bore pit. First display screen 156 has a fourth field which shows the temperature differential in degrees Fahrenheit between the initial temperature (at time of calibration) of the electronic components of sensor package 122 and the current temperature. The inventors herein have found that the best accuracy from the sensor package 122 is realized when the temperature differential is kept at +/−30 degrees F. from the calibrated temperature of sensor package 122. If the temperature differential exceeds this amount, water discharge control 134 may be actuated to provides a stream of water through water discharge 116 which is adjacent to the sensor package 122.

A user may use enter button 148 of controller 130 to toggle to second display screen 158. Second display screen 158 has a first field which shows the current temperature of the electrical components of sensor package 122. Second display screen 158 has a second field which shows the temperature of the electrical components of the sensor package 122 when it was calibrated by the user. Second display screen 158 has a third field which displays the user inputted diameter for the casing diameter at the time of calibration.

FIG. 11 also shows NO COMS screen 160 which appears at any time the controller 130 loses communication with the sensor package 122. The possible causes for a loss of communication are a pinched or burned wire, a cable not being plugged in, a wiring error made when splicing new lengths of communications cable 106 as the lead casing 10 moves forward in the bore, or a bad splice made when splicing in new lengths of communication cable.

FIG. 11 also shows LED screen 162. LED screen 162 appears any time the light emitting diode 124 or other illumination device is toggled to the "on" position by actuation of control 134. Toggling the control 134 to the "off" position returns to the previously displayed screen.

Having thus described the preferred embodiments of the invention, what is claimed as new and desired to be protected by Letters Patent includes the following:

1. A line and level determination system for a trenchless construction apparatus comprising:
   a housing assembly for attachment to a lead casing installed as a component of the trenchless construction apparatus, the lead casing comprising an aperture which penetrates through a wall of the casing into an interior of the casing, wherein the housing assembly comprises an opening configured to receive a water hose and an electrical lead, the housing assembly further comprising a water discharge, an inclinometer, and a light emitting device disposed adjacent to the water discharge, wherein the water discharge is configured to discharge water through the aperture into the interior of the casing;
   a water source connected to the water hose; and
   a controller conductively connected by the electrical lead to the inclinometer and the light emitting device, the controller comprising a power source, a plurality of controls to energize the inclinometer and the light emitting device, and a screen for displaying input from the inclinometer.

2. The line and level determination system of claim 1 wherein the light emitting device comprises a laser.

3. The line and level determination system of claim 1 wherein the light emitting device comprises a light emitting diode.

4. The line and level determination system of claim 1 wherein the inclinometer comprises a tilt sensor.

5. The line and level determination system of claim 4 wherein the tilt sensor comprises an accelerometer.

6. The line and level determination system of claim 1 wherein the inclinometer is encased within a waterproof epoxy.

7. The line and level determination system of claim 1 wherein the housing assembly comprises a steel body.

8. The line and level determination system of claim 7 wherein the housing assembly comprises a wall angle iron having a size of 1¾" by 1¾" by 0.1875".

9. The line and level determination system of claim 7 wherein the housing assembly is welded to the lead casing.

10. The line and level determination system of claim 1 wherein the water discharge comprises a slot.

11. The line and level determination system of claim 1 wherein the controller comprises a display screen.

12. The line and level determination system of claim 11 wherein the display screen displays a percent grade.

13. The line and level determination system of claim 11 wherein the display screen displays an amount of roll.

14. The line and level determination system of claim 11 wherein the display screen displays a current temperature of an accelerometer chip disposed in the housing assembly.

15. The line and level determination system of claim 9 wherein the housing assembly comprises alignment notches configured for alignment of the slot of the water discharge within the housing assembly.

16. A method of ascertaining a line and a level of a jacked or rammed casing comprising the following steps:
   activating a light emitting device disposed within a housing assembly, the housing attached to the casing, wherein the housing assembly comprises a water discharge disposed adjacent to an opening which penetrates into an interior of the casing; and
   pumping a stream of water through a line connected to the housing assembly wherein the housing assembly is configured to direct the stream of water to the water discharge, wherein the stream of water is illuminated by the light emitting device resulting in an illuminated stream of water flowing into the interior of the auger casing.

17. The method of claim 16 comprising the further step of targeting the illuminated stream of water to ascertain the line and level of the auger casing.

18. The method of claim 17 wherein an auger is disposed within the casing.

19. The method of claim 16 wherein the housing assembly comprises an inclinometer connected to a controller, wherein the inclinometer is configured to provide a readout of a percent grade and an amount of roll to the controller.

20. An apparatus configured to ascertain a line and grade of a lead casing installed within a trenchless construction system, wherein an auger is disposed within the lead casing, the apparatus comprising:
   a housing assembly for attachment to the lead casing installed as a component of the trenchless construction system, the housing assembly comprising a water discharge, and a light emitting device disposed adjacent with the water discharge, wherein the water discharge is disposed adjacent to an opening which penetrates into an interior of the lead casing; and
   a hose having a first end attached to the water discharge, the hose having a second end attached to a water source, wherein a stream of water flowing from the water discharge into the interior of the lead casing is illuminated by the light emitting device.

* * * * *